(12) United States Patent
Fushiki et al.

(10) Patent No.: US 8,008,877 B2
(45) Date of Patent: Aug. 30, 2011

(54) ELECTRICALLY-DRIVEN DUMP TRUCK

(75) Inventors: Michio Fushiki, Tsuchiura (JP); Hajimu Kozawa, Ishioka (JP); Takashi Yagyuu, Ushiku (JP); Tomohiko Yasuda, Kashiwa (JP); Kazuhiro Imaie, Hitachi (JP)

(73) Assignees: Hitachi Construction Machinery Co., Ltd., Tokyo (JP); Hitachi, Ltd., Tokyo (JP)

( * ) Notice: Subject to any disclaimer, the term of this patent is extended or adjusted under 35 U.S.C. 154(b) by 29 days.

(21) Appl. No.: 12/547,967

(22) Filed: Aug. 26, 2009

(65) Prior Publication Data

US 2010/0051359 A1 Mar. 4, 2010

(30) Foreign Application Priority Data

Sep. 3, 2008 (JP) ................................. 2008-225893
Jul. 30, 2009 (JP) ................................. 2009-177809

(51) Int. Cl.
*H02K 7/106* (2006.01)
(52) U.S. Cl. ..................... 318/372; 318/472; 180/65.1
(58) Field of Classification Search ................. 180/65.1, 180/65.8, 68.2, 89.1, 165, 313, 68.5; 318/375, 318/376, 380, 472; 701/22, 50; 290/45
See application file for complete search history.

(56) References Cited

U.S. PATENT DOCUMENTS

| | | | | |
|---|---|---|---|---|
| 4,190,265 A * | 2/1980 | Goodbary et al. | ..... | 280/124.136 |
| 4,307,300 A * | 12/1981 | Kisami | .......................... | 307/9.1 |
| 4,546,696 A * | 10/1985 | Fogg | .............................. | 454/163 |
| 4,630,024 A * | 12/1986 | Allen | ............................... | 338/58 |
| 4,684,152 A * | 8/1987 | Goodbary et al. | ............ | 280/785 |
| 4,719,361 A * | 1/1988 | Brubaker | ........................ | 290/45 |
| 5,396,214 A * | 3/1995 | Kumar | .......................... | 338/279 |
| 5,629,596 A * | 5/1997 | Iijima et al. | .................... | 318/762 |
| 6,081,183 A * | 6/2000 | Mading et al. | .................. | 338/57 |
| 6,430,045 B1 * | 8/2002 | Everitt | .......................... | 361/690 |
| 6,653,806 B1 * | 11/2003 | Ono | ................................ | 318/375 |
| 6,678,972 B2 * | 1/2004 | Naruse et al. | .................... | 37/466 |
| 6,923,155 B2 * | 8/2005 | Gottemoller et al. | ....... | 123/198 F |
| 7,106,016 B2 * | 9/2006 | Jackson | ......................... | 318/380 |
| 7,126,299 B2 * | 10/2006 | Jackson | ......................... | 318/380 |
| 7,721,855 B2 * | 5/2010 | Marsh et al. | ........... | 188/264 AA |
| 7,733,615 B2 * | 6/2010 | Eschleman et al. | ............. | 361/23 |
| 2006/0005736 A1 * | 1/2006 | Kumar | ............................ | 105/1.4 |

(Continued)

FOREIGN PATENT DOCUMENTS

JP 2007-16906 A 1/2007

*Primary Examiner* — Jeffrey J Restifo
*Assistant Examiner* — Brodie Follman
(74) *Attorney, Agent, or Firm* — Mattingly & Malur, P.C.

(57) ABSTRACT

An electrically-driven dump truck 1 uses resistors to convert electric power generated during retarder braking operation into heat energy. A body frame 2 has front and rear wheels, a support base 2A, a cab 4 mounted on an upper left surface of the support base, and a control cabinet 3 mounted on an upper surface of the support base. A plurality of resistor boxes 5 are mounted on an upper base plate 2B and are arranged in a stacked manner such that the plurality of resistor boxes 5 are located to the right of the control cabinet 3 in order to secure right side visibility from the cab 4. Each resistor box has a casing with plural resistors connected in parallel, an inlet port and an outlet port. A fan for cooling the resistors is housed in the casing.

11 Claims, 7 Drawing Sheets

U.S. PATENT DOCUMENTS

| | | | |
|---|---|---|---|
| 2006/0022631 A1* | 2/2006 | Marsh et al. | 318/759 |
| 2007/0145918 A1* | 6/2007 | Kumar et al. | 318/139 |
| 2008/0265812 A1* | 10/2008 | Adra | 318/375 |
| 2008/0315805 A1* | 12/2008 | Kumar et al. | 318/362 |
| 2009/0179486 A1* | 7/2009 | Ikeda et al. | 303/152 |
| 2010/0026079 A1* | 2/2010 | Nabeshima et al. | 298/17 R |
| 2010/0065355 A1* | 3/2010 | Reddy | 180/65.31 |
| 2010/0066280 A1* | 3/2010 | Marchand et al. | 318/380 |
| 2010/0066292 A1* | 3/2010 | Gottemoller et al. | 318/472 |
| 2010/0070120 A1* | 3/2010 | Bailey et al. | 701/22 |
| 2010/0187044 A1* | 7/2010 | Nabeshima et al. | 184/26 |
| 2010/0203820 A1* | 8/2010 | Marsh et al. | 454/237 |
| 2011/0041723 A1* | 2/2011 | Kumar | 105/35 |

* cited by examiner

ELECTRICALLY-DRIVEN DUMP TRUCK

BACKGROUND OF THE INVENTION

1. Field of the Invention

The present invention relates generally to electrically-driven dump trucks and specifically to an electrically-driven dump truck with increased side visibility.

2. Description of the Related Art

A dump truck refers generally to a truck with a mechanical apparatus that is used to unload all the loaded material from its dump box at a time by lifting the front of the dump box. There are two types of dump trucks: on-road and off-road dump trucks. The off-road dump trucks are specifically designed for use at large-scale construction sites or mines. Such off-road dump trucks have been increased in size for the purpose of improving labor efficiency. For instance, giant dump trucks are now widely used at strip mines around the world.

For the purpose of improving the efficiency and maintainability of such giant dump trucks, their drive scheme is now shifting from a diesel-engine direct drive scheme to an electric drive scheme that involves the use of an alternating-current (AC) electric motor powered by a diesel engine. An example of a dump truck employing such an electric drive scheme is disclosed in JP,A 2007-16906 (pp. 6-7, FIGS. 1-2). Such an electrically-driven dump truck operates its electric motor as a generator during braking and causes resistors to consume the regenerative electric power from the electric motor, thereby obtaining a braking force. This braking method is termed dynamic braking (retarder-aided braking).

SUMMARY OF THE INVENTION

The dynamic braking resistors of such a giant-sized dump truck as mentioned above are often housed in large resistor boxes each with a cooling fan due to their large size and to the necessity to cool the resistors heated during application of electric currents. In the case of a giant dump truck, the capacity of its resistors that consume regenerative electric power often needs to be increased greatly for the purpose of increasing its dynamic braking force, which results in an increase in the size of its resistor boxes.

To suppress the width-directional dimensions of a dump truck, resistor boxes are generally mounted on its platform located at an upper front section of the truck such that the resistor boxes are located in a lateral direction of the cab and such that a longitudinal direction of the resistor boxes is parallel to an anterior-posterior direction of the truck. This arrangement of the resistor boxes impairs side visibility from the cab because the front sections of the resistor boxes protrude in an anterior direction of the truck.

Moreover, the noise of the cooling fans inside the resistor boxes is easily propagated into the cab, which increases the noise level inside the cab, because the cooling fans are large in size and thus produce a high level of noise and also because the front sections of the resistor boxes protrude up to a position where the front sections and the cab are positioned in the same lateral direction when viewed from the cab. Hence, there is a growing demand for the above issues to be addressed.

The present invention has been contrived to address the above issues, and one of the objects of the invention is to provide an electrically-driven dump truck with improved side visibility from its cab.

Another is to provide an electrically-driven dump truck with a reduced noise level inside the cab.

To achieve the above objects, the invention is, in a first aspect, an electrically-driven dump truck that involves the use of resistors to convert electric power generated during retarder braking operation into heat energy, the dump truck comprising: a body frame having front and rear wheels attached thereto; a support base mounted on an upper front section of the body frame; a cab mounted on an upper left surface of the support base; a control cabinet mounted on an upper surface of the support base such that the control cabinet is located on the right rear side of the cab; a base plate mounted on an upper surface of the support base, the upper surface being located to the right of the control cabinet; and a plurality of resistor boxes mounted on an upper surface of the base plate; wherein the plurality of resistor boxes are arranged on the upper surface of the base plate in a stacked manner such that the plurality of resistor boxes are located to the right of the control cabinet in order to secure right side visibility from the cab, and wherein the plurality of resistor boxes each comprise: a box-shaped casing having an inlet port at one end thereof and an outlet port at the other end thereof; resistors electrically connected in parallel, the resistors being housed in the casing; and a fan for cooling the resistors, the fan being housed in the casing.

A second aspect of the invention is the electrically-driven dump truck of the first aspect, wherein preferably the plurality of resistor boxes are arranged on the support base in a stacked manner such that the direction of an air flow produced by the fans is parallel to an anterior-posterior direction of the body frame.

A third aspect of the invention is the electrically-driven dump truck of the second aspect, wherein preferably the plurality of resistor boxes are arranged on the support base in a stacked manner such that the outlet ports of the plurality of resistor boxes face an anterior direction of the body frame.

A fourth aspect of the invention is the electrically-driven dump truck of the second aspect, wherein preferably the plurality of resistor boxes are arranged on the support base in a stacked manner such that the fans of the plurality of resistor boxes face a posterior direction of the body frame.

A fifth aspect of the invention is the electrically-driven dump truck of the first aspect, wherein preferably the plurality of resistor boxes are arranged on the support base in a stacked manner such that the direction of an air flow produced by the fans is parallel to a width direction of the body frame.

A sixth aspect of the invention is the electrically-driven dump truck of the fifth aspect, wherein preferably the plurality of resistor boxes are arranged on the support base in a stacked manner such that the outlet ports of the plurality of resistor boxes face outward with respect to a width direction of the body frame.

A seventh aspect of the invention is the electrically-driven dump truck of the fifth aspect, wherein preferably the plurality of resistor boxes are arranged on the support base in a stacked manner such that the fans of the plurality of resistor boxes face the right side of the control cabinet.

An eighth aspect of the invention is the electrically-driven dump truck of any one of the first to seventh aspects, wherein preferably the plurality of resistor boxes are joined together by connectors that connect the casings of the plurality of resistor boxes.

A ninth aspect of the invention is the electrically-driven dump truck of any one of the first to seventh aspects, wherein preferably the plurality of resistor boxes are arranged in a stacked manner, joined together by connectors in advance, and mounted on the support base.

A tenth aspect of the invention is the electrically-driven dump truck of the first aspect, wherein preferably the support base comprises: a beam-like support base mounted on an upper front section of the body frame such that a longitudinal direction of the beam-like support base is parallel to a width direction of the body frame; and a base plate attached to the upper right side of the beam-like support base and wherein the plurality of resistor boxes are arranged on an upper surface of the base plate in a stacked manner such that the plurality of resistor boxes are located to the right of the control cabinet.

An eleventh aspect of the invention is the electrically-driven dump truck of the tenth aspect, wherein preferably the plurality of resistor boxes are arranged in a stacked manner, joined together by connectors in advance, and mounted on the base plate.

A twelfth aspect of the invention is the electrically-driven dump truck of any one of the first to eleventh aspects, wherein preferably at least one extra resistor box is provided below a deck that is attached to a front section of the support base.

DESCRIPTION OF THE PREFERRED EMBODIMENTS

Electrically-driven dump trucks according to preferred embodiments of the invention will now be described with reference to the accompanying drawings.

Figure 1:
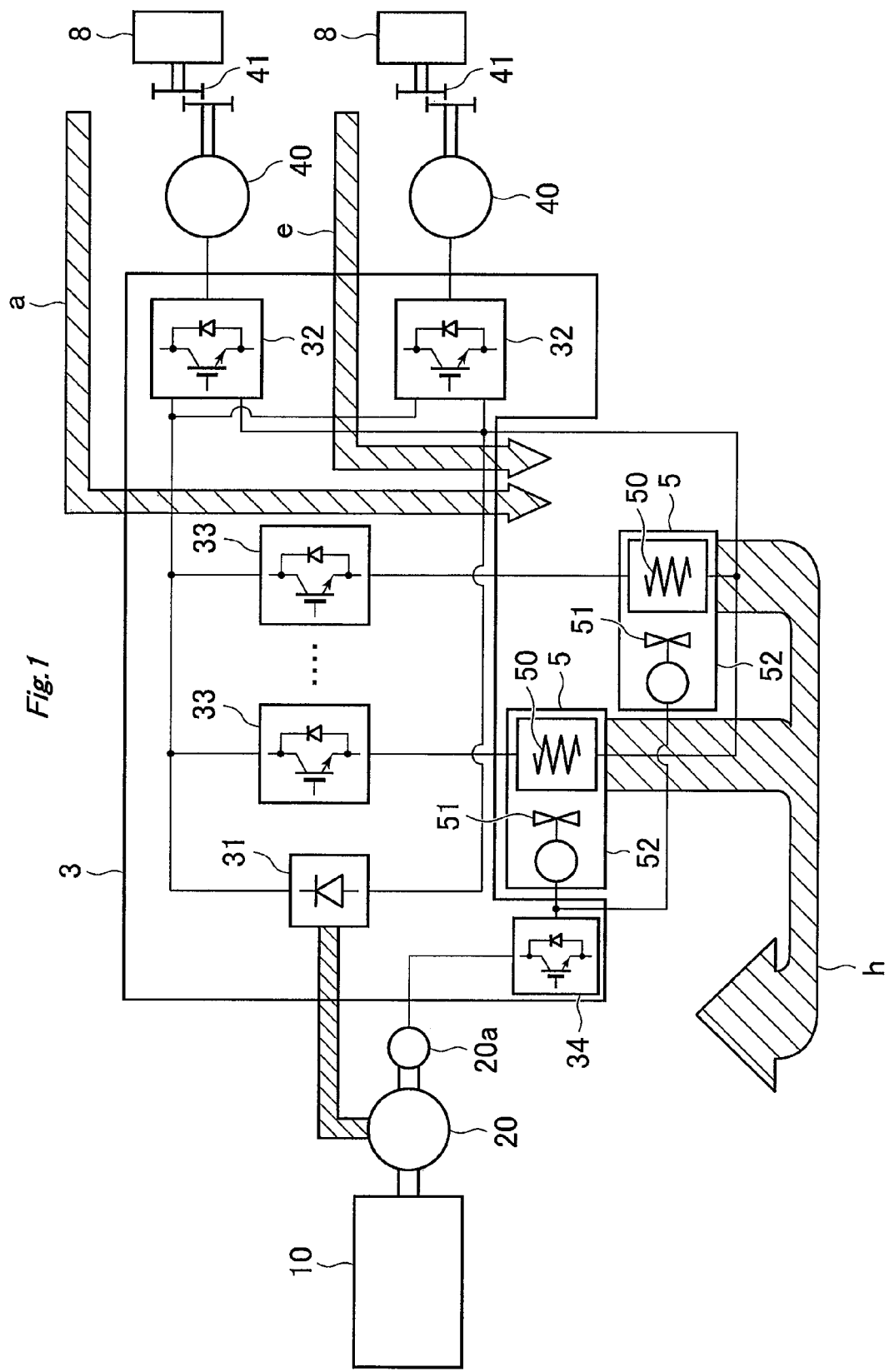
FIG. 1 is a conceptual diagram illustrating the structure of the drive unit of an electrically-driven dump truck according to a first embodiment of the invention.

FIG. 1 is a conceptual diagram illustrating the structure of the drive unit of an electrically-driven dump truck 1 according to a first embodiment of the invention. The drive unit comprises the following components: a diesel engine 10, or a prime mover (hereinafter referred to simply as "engine 10"); a main generator 20 connected to the engine 10 via a rotary shaft; an auxiliary generator 20a connected to the rotary shaft of the main generator 20; a control cabinet 3 that converts AC power from the main generator 20 into electric power at any desired frequency; wheel-drive electric motors 40 that obtain rotative power by receiving the electric power from the control cabinet 3; and resistor boxes 5 that each house a resistor 50 that consumes the regenerative electric power e that occurs during retarder braking operation.

The control cabinet 3 comprises the following components: a rectifier 31 that rectifies AC power from the main generator 20; inverters 32 that convert the rectified power by the rectifier 31 into electric power at any desired frequency; semiconductor switches 33 that electrically connect the resistors 50 to the inverters 32 or disconnect the resistors 50 from the inverters 32; and a power transformer 34 that converts the output from the auxiliary generator 20a into electric power to drive cooling fans 51 inside the resistor boxes 5. During retarder braking operation, the inverters 32 receive AC power, or the regenerative electric power e, from the wheel-drive electric motors 40 and convert the regenerative electric power e into DC power; that is, the inverters 32 serves as bidirectional (AC-to-DC and DC-to-AC) converters. The wheel-drive electric motors 40 are each connected to a rear wheel 8 via a decelerator 41. The resistor boxes 5 each comprise a resistor 50, a cooling fan 51, and a casing 52 that houses those components (50 and 51).

AC paths are established between the output terminal of the main generator 20 and the rectifier 31, between the output terminal of the auxiliary generator 20a and the input terminal of the power transformer 34, between the AC-side terminals of the inverters 32 and the wheel-drive electric motors 40, and between the output terminal of the power transformer 34 and each of the cooling fans 51. Also, DC paths are established between the DC-side terminals of the inverters 32 and the resistors 50 via the respective switches 33. Such DC circuits each consisting of one of the resistors 50 and one of the switches 33 are arranged in parallel. During the acceleration of the dump truck 1, the main generator 20 connected to the engine 10 generates AC power, and the AC power is transmitted to the control cabinet 3, where it is converted into electric power at a desired frequency. This electric power is then transmitted to each of the wheel-drive electric motors 40. This allows the wheel-drive electric motors 40 to drive via the decelerators 41 the axles to which the rear wheels 8 are attached. During retarder braking operation, on the other hand, the wheel-drive electric motors 40 operate as generators, and AC power generated by the wheel-drive electric motors 40 (or the regenerative electric power e) is transmitted to the control cabinet 3. The inverters 32 inside the control cabinet 3 then convert the regenerative AC power e into DC power. Thereafter, the switches 33 are controlled optimally so that the DC power is consumed by the resistors 50 and turned into heat energy h. The heat energy h is released into the atmosphere by AC power generated from the auxiliary generator 20a driving the cooling fans 51 via the power transformer 34.

Figure 2:
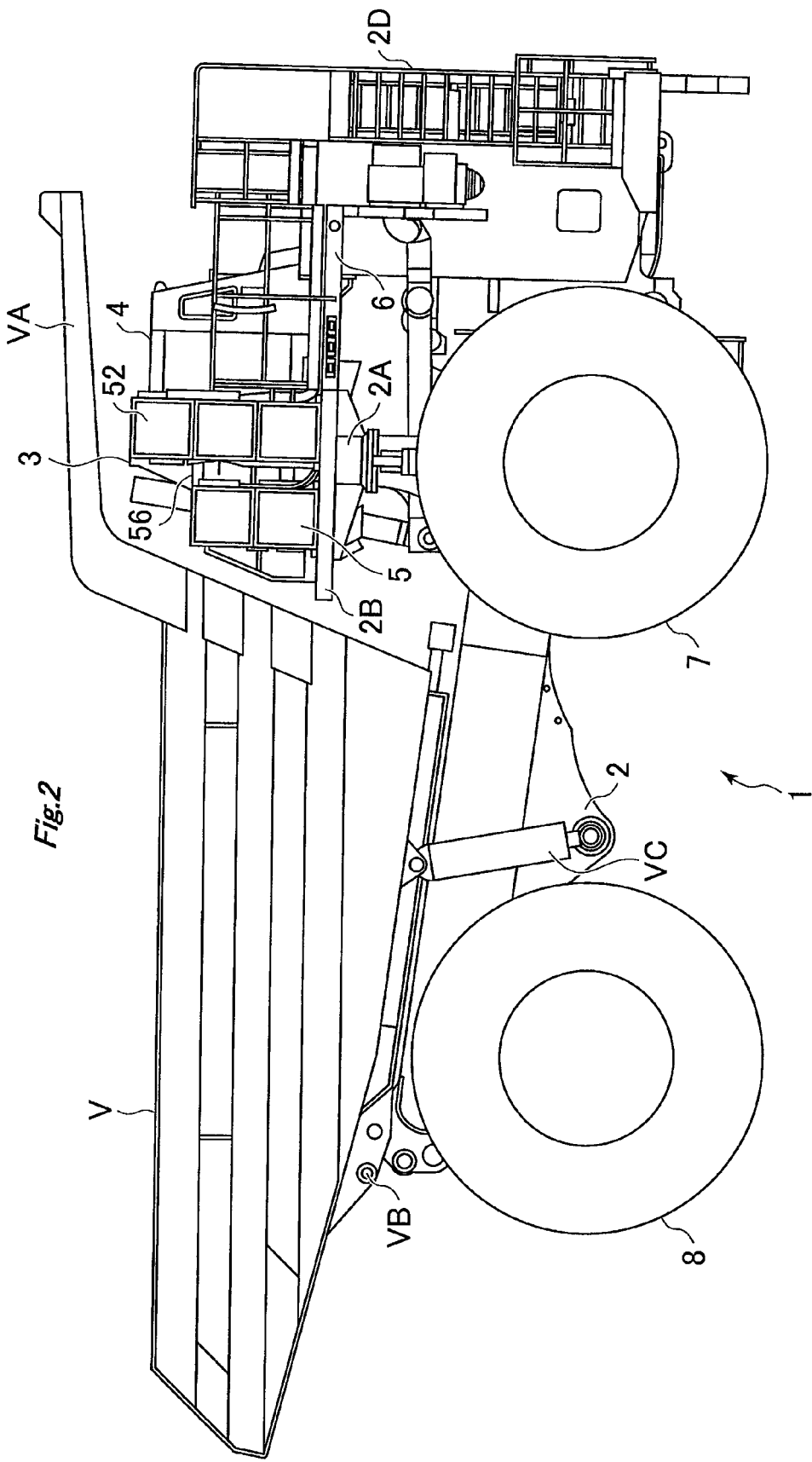
FIG. 2 is a conceptual side-view diagram illustrating the electrically-driven dump truck according to the first embodiment of the invention.
Figure 3:
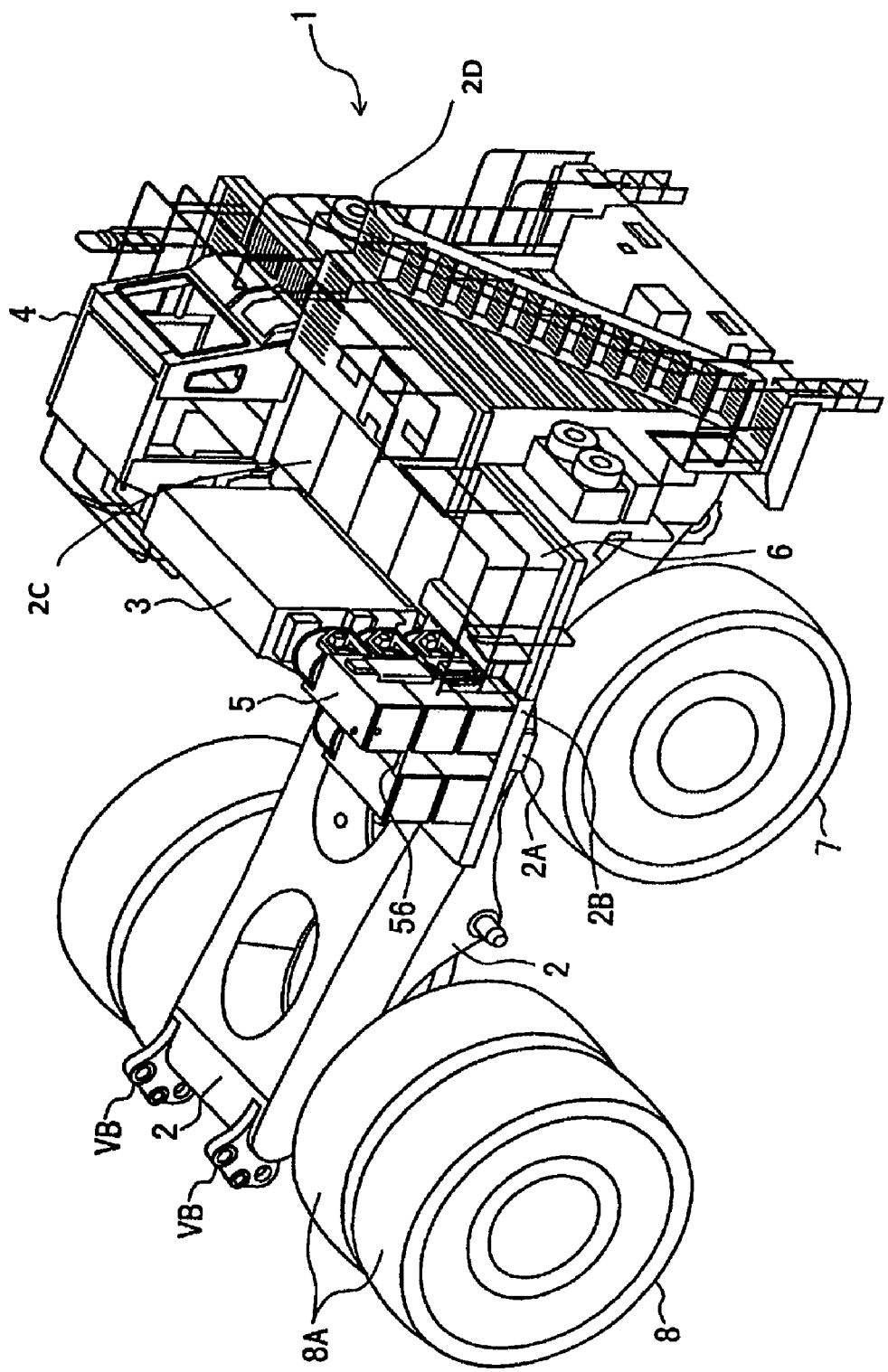
FIG. 3 is a conceptual perspective diagram illustrating the electrically-driven dump truck according to the first embodiment of the invention without its vessel.

The electrically-driven dump truck 1 according to the first embodiment of the invention is further described with reference to FIGS. 2 and 3. FIG. 2 is a conceptual side-view diagram illustrating the electrically-driven dump truck 1 according to the first embodiment of the invention. FIG. 3 is a conceptual perspective diagram illustrating the electrically-driven dump truck 1 according to the first embodiment of the invention without its vessel (dump box).

As shown in FIG. 2, the dump truck 1 according to the first embodiment comprises a body frame 2, or a support structure, that extends in a front-back direction of the dump truck 1 and a vessel V, or a dump box, that is mounted on the body frame 2 in a liftable manner.

Both sides (right and left sides) of the front section of the body frame 2 are provided with front wheels 7 in a rotatable manner. The front wheels 7 are steered by the driver of the dump truck 1. Also, both sides (right and left sides) of the rear section of the body frame 2 are provided with the rear wheels 8 in a rotatable manner. The rear wheels 8 are rotated by the respective wheel-drive electric motors 40 via the decelerators 41. As shown in FIG. 3, the number of the rear wheels 8 is four in total with two of them arranged on both sides (the rear wheels are indicated by the reference numeral 8A in FIG. 3).

The vessel V is a giant-sized vessel into which to load a large amount of heavy material such as crushed rocks and the like. The rear bottom section of the vessel V is attached to the rear end of the body frame 2 via a pin joint VB so that the front of the vessel V is lifted. The vessel V is lifted by hoist cylinders VC that extends and contracts with working fluid. The upper front section of the vessel V is provided with a canopy VA that covers the control cabinet 3, a cab 4, and the resistor boxes 5 from above (these components below the canopy VA are described in detail below).

The upper front section of the body frame 2 is provided with a beam-like support base 2A, which is arranged perpendicularly to a front-back direction of the dump truck 1. The engine 10, or a prime mover, and the main generator 20 (both not illustrated in FIGS. 2 and 3) are mounted in the width-directional center of the body frame 2 below the support base 2A, and the wheel-drive electric motors 40 (not illustrated in FIGS. 2 and 3) are attached to the rear lower section of the body frame 2.

As shown in FIG. 3, a passageway 2C for mechanical check-ups is provided in the front section of the support base 2A, and a ladder 2D is attached to the front section of the passageway 2C.

Inside the cab 4 are a cab seat, a starter switch, a gas (accelerator) pedal, a brake pedal, a steering wheel, multiple control levers, and the like (not illustrated). As shown in FIG. 3, the cab 4 is fixed to the support base 2A such that it is located on one side of the support base 2A (in this case, on the width-directional left side of the body frame 2).

The chassis of the control cabinet 3 is horizontally-long-shaped and has a slope section on its back side so as to prevent contact with the lower face of the canopy VA of the vessel V. The chassis of the control cabinet 3 houses the above-mentioned rectifier 31, inverters 32, switches 33, power transformer 34 (not illustrated in FIGS. 2 and 3) and other control devices. As shown in FIG. 3, the control cabinet 3 is mounted on a substantially central upper section of the support base 2A, which section is located on the right rear side of the cab 4, so that side visibility from the cab 4 (in this case, right side visibility) can be secured.

Multiple resistor boxes 5 are mounted on a substantially square-shaped base plate 2B in the form of two stacks. In the example shown in FIGS. 2 and 3, the front stack consists of three resistor boxes 5, and the rear stack consists of two resistor boxes 5. The reason the rear stack consists of the two resistor boxes 5 is to prevent contact between the rear stack and the lower face of the canopy VA of the vessel V.

In addition, the multiple resistor boxes 5 are arranged so that the air flow direction of the resistor boxes 5 (i.e., a longitudinal direction of the resistor boxes 5), described later, is parallel to a width direction of the body frame 2. The front and rear stacks of the resistor boxes 5 are joined together by, for example, a substantially turned square U-shaped, horizontal metal connector 56. As shown in FIG. 3, the base plate 2B is fixed to the right side of the support base 2A (the right side being the width-directional right side of the body frame 2) such that the base plate 2B is located to the right of the control cabinet 3.

The above arrangement of the multiple resistor boxes 5 ensures right side visibility from the cab 4.

A deck 6 is arranged at a position that is anterior to the support base 2A and above the front section of the body frame 2, with a predetermined interval provided between the support base 2A and the deck 6. Further, as shown in FIG. 3, the deck 6 is positioned anterior to the control cabinet 3 and the resistor boxes 5, and space is provided on the deck 6 for mechanical check-ups of the resistor boxes 5.

Figure 4:
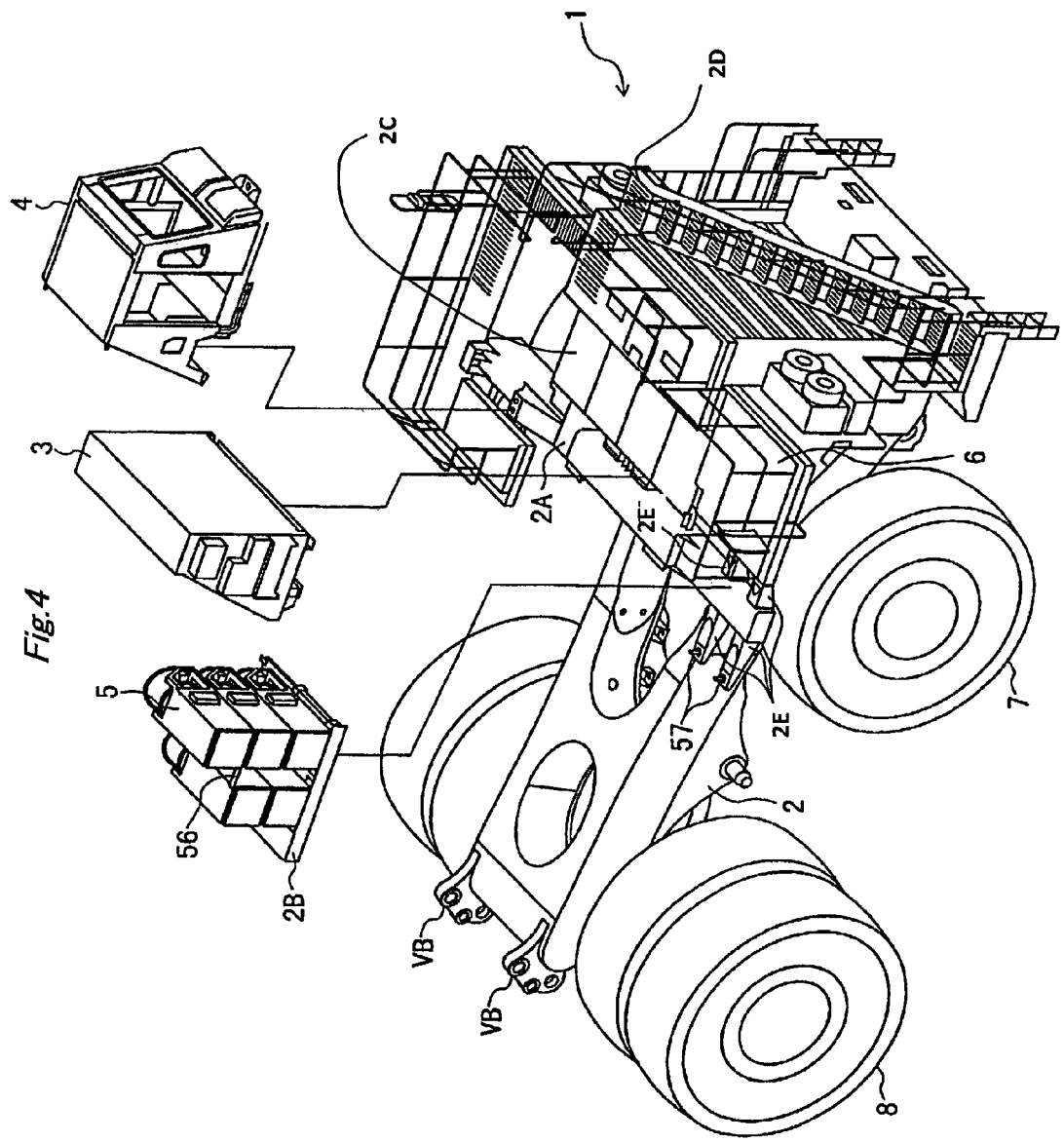
FIG. 4 is a perspective view showing the positional relationship between the respective components and the cab-supporting base of the electrically-driven dump truck according to the first embodiment of the invention.

Discussed next with reference to FIG. 4 is the positional relationship between the respective components and the support base 2A of the above-mentioned dump truck 1 according to the first embodiment of the invention.

FIG. 4 is a perspective view showing the positional relationship between the respective components and the support base 2A of the electrically-driven dump truck 1 according to the first embodiment of the invention. In FIG. 4, the same reference numerals as those used in FIGS. 2 and 3 denote the same parts. As stated above, the cab 4 is mounted on one side of the support base 2A, and the base plate 2B on which the resistor boxes 5 are arranged is mounted on the other side of the support base 2A. Also, the control cabinet 3 is arranged on the support base 2A such that the control cabinet 3 is positioned next to the cab 4. The portion of the support base 2A on which the base plate 2B is mounted is provided with two pairs of front and back brackets 2E. One end of each of the brackets 2E is fixed to the support base 2A, and the other end of each of the brackets 2E extends forward or backward, i.e., perpendicularly to a longitudinal direction of the support base 2A. The above other end of each of the brackets 2E is provided with a joint section for attachment of the base plate 2B, and this joint section has a doughnut-shaped shock absorber 57 attached thereto. The base plate 2B is attached to the above other ends of the brackets 2E by bolting the base plate 2B, the shock absorbers 57, and the joint sections. Further, the front vertical surface of the control cabinet 3 and the front-facing side surface of the front stack of the three resistor boxes 5 on the base plate 2B (the side surfaces of the resistor-box stacks are parallel to a longitudinal direction of the stacks) jointly form substantially the same plane along a width direction of the body frame 2, thereby securing side visibility from the cab 4.

Figure 5:
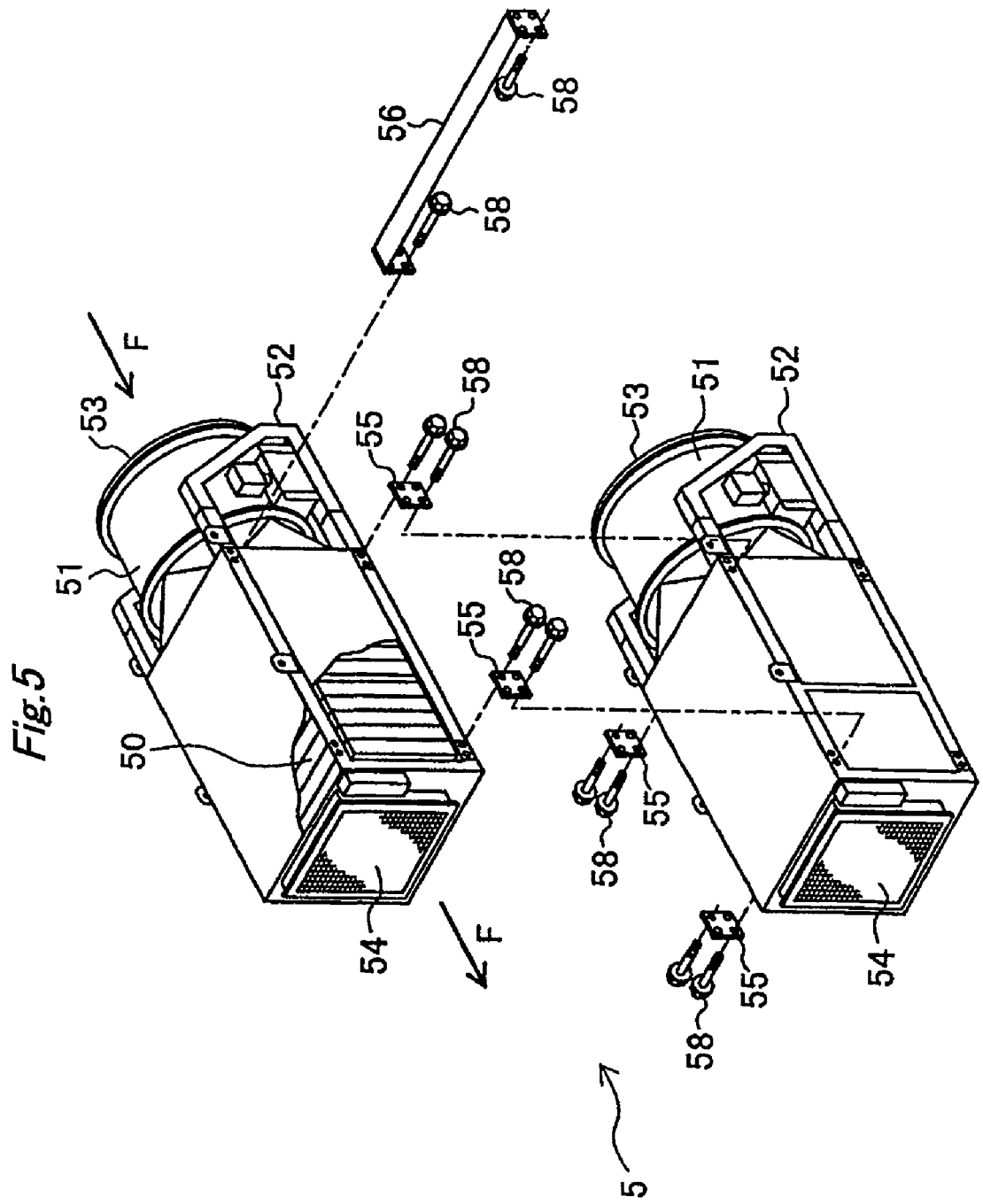
FIG. 5 is an enlarged perspective view of the resistor boxes of the electrically-driven dump truck according to the first embodiment of the invention.

With reference now to FIG. 5, the resistor boxes 5 of the above-mentioned dump truck 1 according to the first embodiment of the invention are discussed in detail.

FIG. 5 is an enlarged perspective view of the resistor boxes 5 of the electrically-driven dump truck 1 according to the first embodiment of the invention. Each of the resistor boxes 5 comprises a substantially hexahedron-shaped casing 52; a grid-like resistor 50 housed in the casing 52; a cooling fan 51 having a substantially cylinder-shaped casing therearound; a substantially circular inlet port 53 located at one end of the casing 52; and a substantially square outlet port 54 located at the other end of the casing 52. The outlet port 54 is covered with, for example, a crimped wire mesh for preventing entry of foreign substances. The two resistor boxes 5 shown in FIG. 5 are vertically joined together by connecting their respective casings 52 with substantially rectangular-shaped, vertical metal connectors 55 and bolts 58. As stated above, when the resistor boxes 5 are arranged in the forms of font and rear stacks, the casing 52 of one of the resistor boxes 5 of the front stack and the casing 52 of one of the resistor boxes 5 of the rear stack are joined together with the substantially turned square U-shaped, horizontal metal connector 56 and the bolts 58.

Each of the resistor boxes 5 rotates its cooling fan 51 to draw in air through its inlet port 53, and its grid-like resistor 50 is cooled by the air passing therethrough. The air that received heat is then discharged through the outlet port 54 of that resistor box 5. To put it another way, the air flow direction through each of the resistor boxes 5 is, as indicated by the arrows F in FIG. 5, from its inlet port 53 to its outlet ports 54, that is, a longitudinal direction of its casing 52. As shown in FIGS. 2 to 4, in the first embodiment of the invention, the resistor boxes 5 are arranged in a stacked manner such that the air flow direction of the resistor boxes 5 is parallel to a width direction of the body frame 2 and such that the outlet ports 54 of the resistor boxes 5 face outward.

Also, the cooling fans 51 of the resistor boxes 5 are arranged so as to face the right side of the control cabinet 3, and proper space is provided between the inlet ports 53 of the resistor boxes 5 and the right side of the control cabinet 3 so as to prevent, for example, the increase of the wind roar of the cooling fans 51. Since the cooling fans 51 are arranged so as to face the right side of the control cabinet 3, which side is away from the cab 4, the propagation of the noise of the cooling fans 51 into the cab 4 can also be suppressed, thereby improving the operating environment inside the cab 4.

In the electrically-driven dump truck 1 of the first embodiment of the invention, since the multiple resistor boxes 5 are arranged in a stacked manner in an upper right direction from the body frame 2 of the dump truck 1, the resistor boxes 5 take less installation space while securing the required capacity of the resistors 50 for generating dynamic braking force. In addition, sufficient space can be secured over the deck 6 when viewed from the cab 4, leading to improved side visibility from the cab 4. Thus, the driver can easily notice obstacles from the cab 4 even if the obstacles lie below the installation position of the resistor boxes 5, which leads to improvement in safety and labor efficiency.

The canopy VA of the vessel V almost completely covers the control cabinet 3, the cab 4, and the resistor boxes 5 from above, thereby protecting these components from rocks and the like and also protecting the driver in the cab 4 should the dump truck 1 overturn.

Also, since the deck 6 is provided at a predetermined interval from the support base 2A, the vibrations caused by the deck 6 are not directly transmitted to the support base 2A. Therefore, there is no need to give consideration to vibration suppression for fear of vibration influences on the resistor boxes 5 and the control cabinet 3 except for the components placed directly on the support base 2A. This is distinct from a conventional resistor-box arrangement in which large resistor boxes are arranged with their longitudinal direction parallel to a front-back direction of the truck and in which the front ends of the boxes are partially placed on the deck. In such cases, it has been necessary to consider vibration suppression for the deck as well.

Further, since the multiple resistor boxes 5 on the base plate 2B are vertically and horizontally joined together by the connectors 55 and 56, the resistors 50 are more vibration-resistant.

As stated above, in the first embodiment of the invention, the resistor boxes 5 are placed on the base plate 2B in the form of a front three-box stack and a rear two-box stack and arranged such that the air flow direction of the resistor boxes 5 (i.e., a longitudinal direction of the resistor boxes 5) is parallel to a width direction of the body frame 2 and such that the outlet ports 54 of the resistor boxes 5 face outward. By thus making a longitudinal direction of the resistor boxes 5 parallel to a width direction of the body frame 2, the front vertical surface of the control cabinet 3 and the front-facing side surface of the front stack of the resistor boxes 5 can jointly form substantially the same plane along a width direction of the body frame 2, thereby improving side visibility from the cab 4. Further, by reducing the number of the resistor boxes 5 of the rear stack compared with the front stack, a slope of the resistor boxes 5 can be formed along the slope section of the vessel V that extends from the canopy VA to the body of the vessel V. This leads to efficient installation of the resistor boxes 5. Furthermore, since the outlet ports 54 are arranged so as to face outward, the warm air that results from cooling the resistors 50 is never blown toward the control cabinet 3 but discharged outward. This makes the control cabinet 3 and the cab 4 remain unaffected by the warm air.

In accordance with the first embodiment of the invention, the cooling fans 51 inside the resistor boxes 5 are further reduced in size compared with conventional ones, which leads to improvement in fan efficiency and reduction in the noise levels of the cooling fans 51. Also, since the cooling fans are arranged so as to face the right side of the control cabinet 3, which side is away from the cab 4, the propagation of the noise of the cooling fans 51 into the cab 4 can be suppressed by the control cabinet 3. As a result, the noise level inside the cab 4 can be reduced, which in turn improves the operating environment inside the cab 4.

In the first embodiment of the invention, the resistors 50 of the resistor boxes 5 are arranged in parallel to form multiple dynamic brakes that consume the regenerative electric power e. Thus, even if one of the dynamic brakes becomes out of order, isolating that dynamic brake does not result in loss of all the braking force, albeit the braking force reduces compared with when all the dynamic brakes are in order. Accordingly, even under such circumstances, the dump truck 1 can operate to a certain extent, thus resulting in improvement in the labor efficiency of the dump truck 1. In addition, the use of the same resistor boxes 5 allows the production of various dump trucks with different engine outputs to be easily addressed by simply increasing or decreasing the number of the resistor boxes 5 to be installed. In other words, the use of common parts reduces the production costs of dump trucks.

Figure 6:
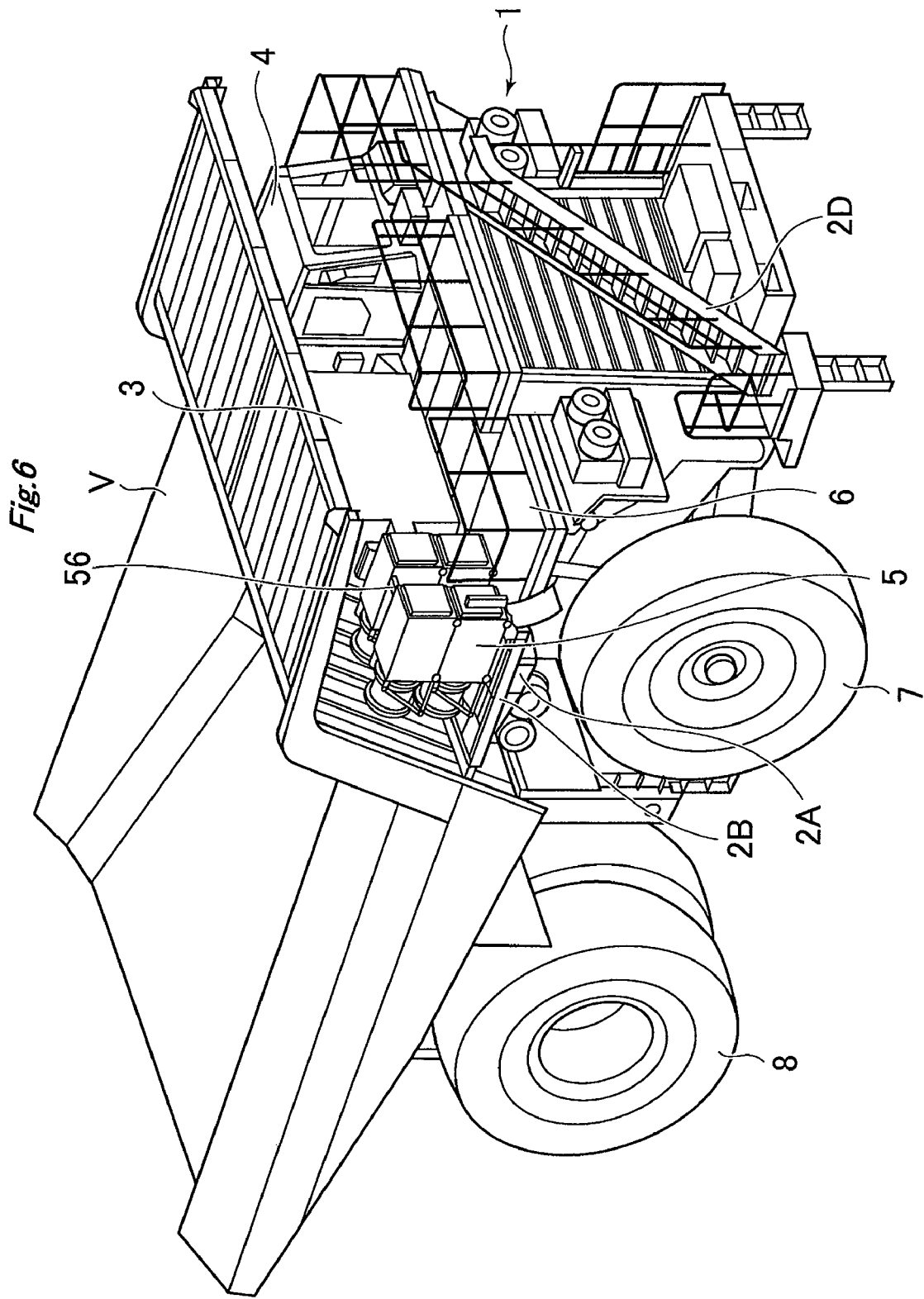
FIG. 6 is a perspective view illustrating an electrically-driven dump truck according to a second embodiment of the invention.

With reference to FIG. 6, an electrically-driven dump truck according to a second embodiment of the invention will now be described. FIG. 6 is a perspective view illustrating the electrically-driven dump truck according to the second embodiment of the invention. In the explanation that follows, the same parts as used in the first embodiment are assigned the same reference numerals and will not be discussed further.

The only difference from the first embodiment lies in the arrangement of the resistor boxes 5; that is, the resistor boxes 5 of the second embodiment are arranged on the base plate 2B in the form of two dual-resistor-box stacks such that a longitudinal direction of the resistor boxes 5 is parallel to a front-back direction of the body frame 2 and such that the outlet ports 54 face forward. The rest is the same as in the first embodiment. In the second embodiment, the faces of the outlet ports 54, or the most anterior faces of the resistor boxes 5, and the front vertical face of the control cabinet 3 are arranged so as to jointly form substantially the same plane along a width direction of the body frame 2, thereby improving side visibility from the cab 4.

The cooling fans 51 inside the resistor boxes 5 are arranged so as to face the rear side of the body frame 2. The inlet ports 53 of the resistor boxes 5 also face the rear side of the body frame 2, that is, the slope section of the vessel V that extends from the canopy VA to the body of the vessel V. By providing proper space between the inlet ports 53 and the slope section of the vessel V, the increase of the wind roar of the cooling fans 51 or the like can be prevented. Since the cooling fans 51 face the slope section of the vessel V, the propagation of the noise of the cooling fans 51 into the cab 4 can be suppressed, thereby improving the operating environment inside the cab 4.

In the second embodiment of the invention as well, the above-mentioned effects of the first embodiment can be obtained similarly.

Since the outlet ports 54 of the resistor boxes 5 of the second embodiment are arranged so as to face forward, the warm air that results from cooling the resistors 50 is never blown toward the vessel V but discharged forward. Thus, the warm air will not stay below the canopy VA, and the control cabinet 3 and the cab 4, both of which are located to the left of the resistor boxes 5, remain unaffected by the warm air.

Further, since the cooling fans 51 of the resistor boxes 5 of the second embodiment face the slope section of the vessel V, the propagation of the noise of the cooling fans 51 into the cab 4 can be suppressed by the control cabinet 3. As a result, the noise level inside the cab 4 can be reduced, which in turn improves the operating environment inside the cab 4.

Although the arrangement of the resistor boxes 5 according to the second embodiment is such that the outlet ports 54 of the resistor boxes 5 face forward, the resistor boxes 5 can instead be arranged such that the outlet ports 54 face backward. In this case, cooling air is drawn in the inlet ports 53 from the front side of the dump truck 1, thereby improving the efficiency in cooling the resistor boxes 5.

Figure 7:
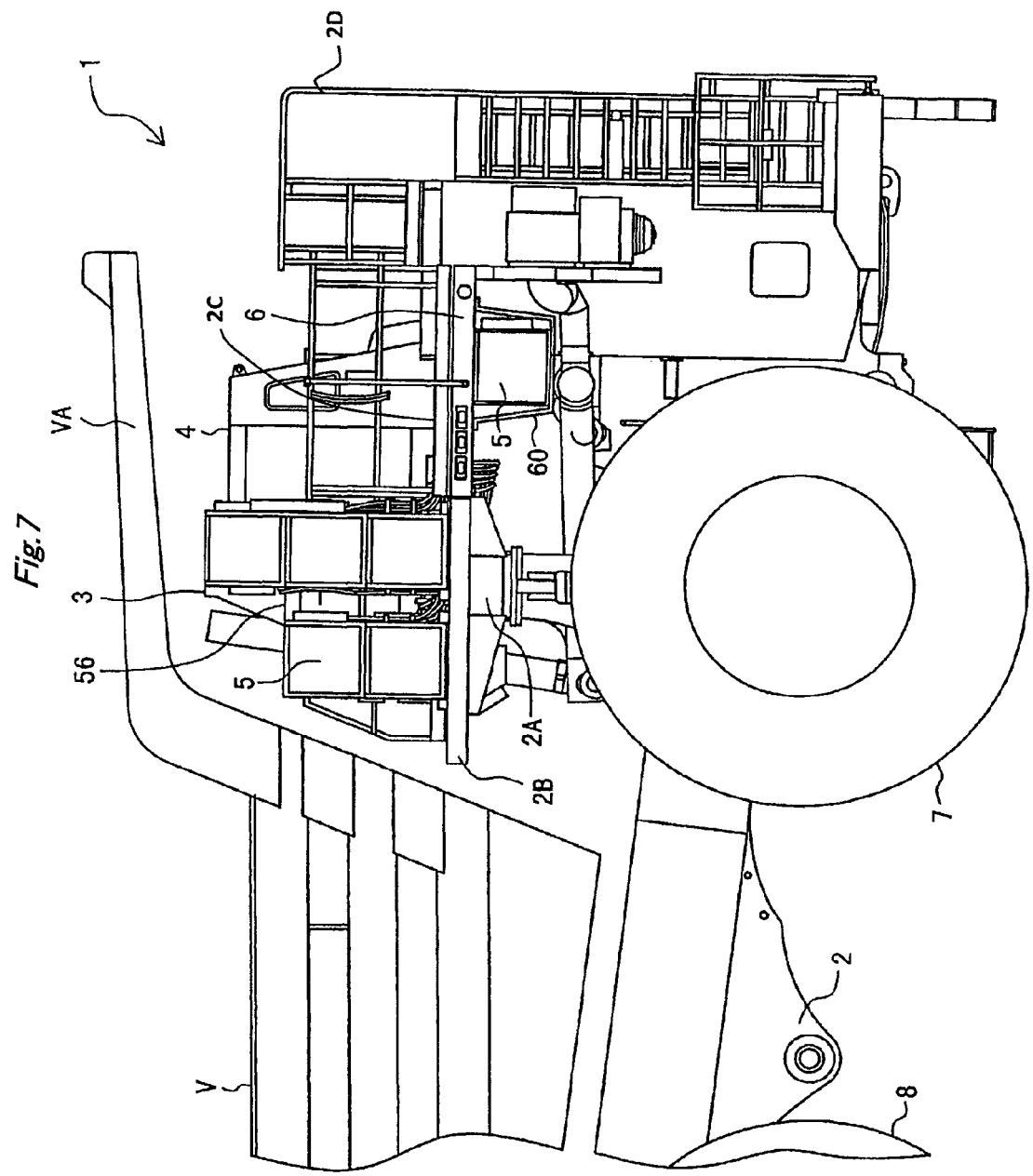
FIG. 7 is a conceptual side-view diagram illustrating an electrically-driven dump truck according to a third embodiment of the invention.

With reference to FIG. 7, an electrically-driven dump truck according to a third embodiment of the invention will now be described. FIG. 7 is a conceptual side-view diagram illustrating the electrically-driven dump truck according to the third embodiment of the invention. In the explanation that follows, the same parts as used in the first and second embodiments are assigned the same reference numerals and will not be discussed further.

In the third embodiment of the invention, a support frame 60 which is made, for example, of steel and substantially turned square U-shaped in cross-section is attached to the bottom section of the deck 6 with a flat section of the support frame 60 parallel to the deck 6. An extra resistor box 5 is mounted on this flat section of the support frame 60 with a longitudinal direction of the extra resistor box 5 parallel to a width direction of the body frame 2. The floor surface of the deck 6 under which the support frame 60 is attached is provided with a removable cover. In mounting the extra resistor box 5 on the support frame 60, the removable cover of the deck 6 is first removed, and the extra resistor box 5 is then mounted on the flat section of the support frame 60. Thereafter, the removable cover is attached back to the deck 6 so as to cover the upper section of the extra resistor box 5.

In the thus-configured electrically-driven dump truck 1 of the third embodiment as well, sufficient space can be secured over the deck 6 when viewed from the cab 4 since the extra resistor box 5 is to be arranged below the deck 6. Thus, even if it becomes necessary to add the extra resistor box 5, side visibility from the cab 4 can be secured.

Although the arrangement of the resistor boxes 5 according to the third embodiment is such that the front resistor-box stack consists of three resistor boxes 5, and the rear stack consists of two resistor boxes 5, the arrangement is not limited to this combination. Further, the number of extra resistor boxes 5 to be arranged below the deck 6 is not limited to one, but can be two or more. Furthermore, as in the second embodiment, the resistor boxes 5 can be arranged in a stacked manner such that a longitudinal direction of the resistor boxes 5 is parallel to a front-back direction of the body frame 2 and such that the outlet ports 54 face forward or backward. In this case, the arrangement directions and the number of the resistor boxes 5 to be arranged below the deck 6 are also not limited.

In accordance with the invention, since multiple resistor boxes are arranged in a stacked manner in an upper right direction from the body frame of a dump truck, the resistor boxes take less installation space while securing the required capacity of the resistors for generating dynamic braking force. In addition, sufficient space can be secured over a deck when viewed from the cab, leading to improved side visibility from the cab. Thus, the driver can easily notice obstacles from the cab even if the obstacles lie below the installation position of the resistor boxes, which leads to improvement in safety and labor efficiency.

Further, in accordance with the invention, the cooling fans inside the resistor boxes are further reduced in size compared with conventional ones, which leads to improvement in fan efficiency and reduction in the noise levels of the cooling fans. Also, since the cooling fans are arranged so as to face the right side of a control cabinet, which side is away from the cab, the propagation of the noise of the cooling fans into the cab can be suppressed by the control cabinet. As a result, the noise level inside the cab can be reduced, which in turn improves the operating environment inside the cab.

What is claimed is:

1. An electrically-driven dump truck that involves the use of resistors to convert electric power generated during retarder braking operation into heat energy, the dump truck comprising:
   a body frame having front and rear wheels attached thereto;
   a support base mounted on an upper front section of the body frame;
   a cab mounted on an upper left surface of the support base;
   a control cabinet mounted on an upper surface of the support base such that the control cabinet is located on the right rear side of the cab;
   a base plate mounted on an upper surface of the support base, the upper surface being located to the right of the control cabinet; and
   a plurality of resistor boxes mounted on an upper surface of the base plate;
   wherein the plurality of resistor boxes are arranged on the upper surface of the base plate in a stacked manner such that the plurality of resistor boxes are located to the right of the control cabinet whereby a front vertical surface of the control cabinet and a front-facing side surface of the front stack of the resistor boxes are in the same plane along a width direction of the body frame in order to secure right side visibility from the cab, and
   wherein the plurality of resistor boxes each comprise:
   a substantially hexahedron-shaped casing having an inlet port at one end thereof and an outlet port at the other end thereof;
   resistors electrically connected in parallel, the resistors being housed in the casing; and
   a fan for cooling the resistors, the fan being housed in the casing.

2. The electrically-driven dump truck defined in claim 1, wherein the plurality of resistor boxes are arranged on the support base in a stacked manner such that the direction of an air flow produced by the fans is parallel to an anterior-posterior direction of the body frame.

3. The electrically-driven dump truck defined in claim 2, wherein the plurality of resistor boxes are arranged on the support base in a stacked manner such that the outlet ports of the plurality of resistor boxes face an anterior direction of the body frame.

4. The electrically-driven dump truck defined in claim 2, wherein the plurality of resistor boxes are arranged on the support base in a stacked manner such that the fans of the plurality of resistor boxes face a posterior direction of the body frame.

5. The electrically-driven dump truck defined in claim 1, wherein the plurality of resistor boxes are arranged on the support base in a stacked manner such that the direction of an air flow produced by the fans is parallel to a width direction of the body frame.

6. The electrically-driven dump truck defined in claim 5, wherein the plurality of resistor boxes are arranged on the support base in a stacked manner such that the outlet ports of the plurality of resistor boxes face outward with respect to a width direction of the body frame.

7. The electrically-driven dump truck defined in claim 5, wherein the plurality of resistor boxes are arranged on the support base in a stacked manner such that the fans of the plurality of resistor boxes face the right side of the control cabinet.

8. The electrically-driven dump truck defined in any one of claims 1 to 7, wherein the plurality of resistor boxes are joined together by connectors that connect the casings of the plurality of resistor boxes.

9. The electrically-driven dump truck defined in claim 1, wherein the plurality of resistor boxes are arranged in a stacked manner, joined together by connectors that connect the casings of the plurality of resistor boxes prior to being mounted on the support base.

10. The electrically-driven dump truck defined in claim 1, wherein the support base comprises:
   a beam-like support base mounted on an upper front section of the body frame such that a longitudinal direction of the beam-like support base is parallel to a width direction of the body frame; and
   a base plate attached to the upper right side of the beam-like support base and
   wherein the plurality of resistor boxes are arranged on an upper surface of the base plate in a stacked manner such that the plurality of resistor boxes are located to the right of the control cabinet.

11. The electrically-driven dump truck defined in claim 10, wherein the plurality of resistor boxes are arranged in a stacked manner, joined together by connectors that connect the casings of the plurality of resistor boxes prior to being mounted on the base plate.

* * * * *